U. V. AVERITT.
COMBINATION SALT AND PEPPER SHAKER.
APPLICATION FILED MAR. 1, 1916.
1,259,469.
Patented Mar. 19, 1918.
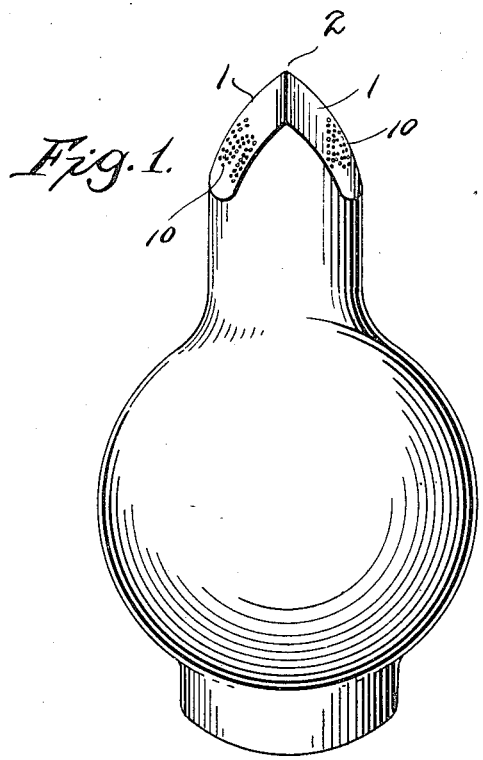
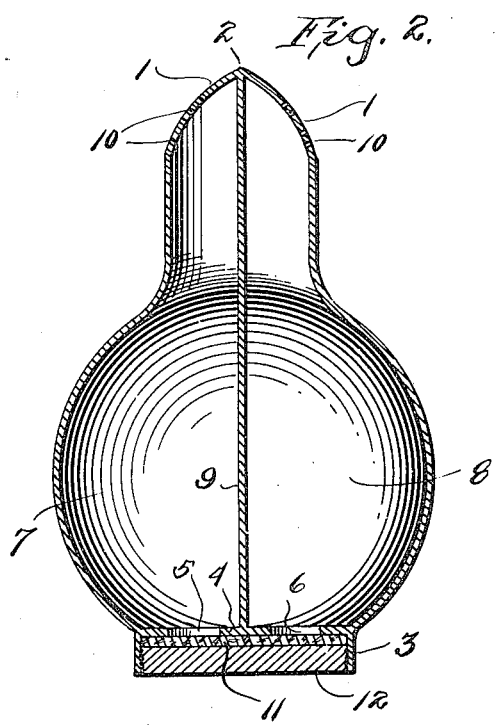
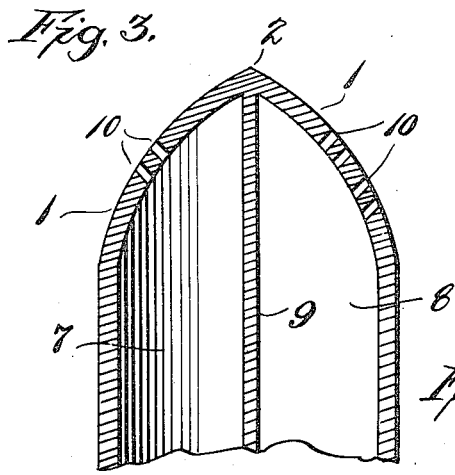
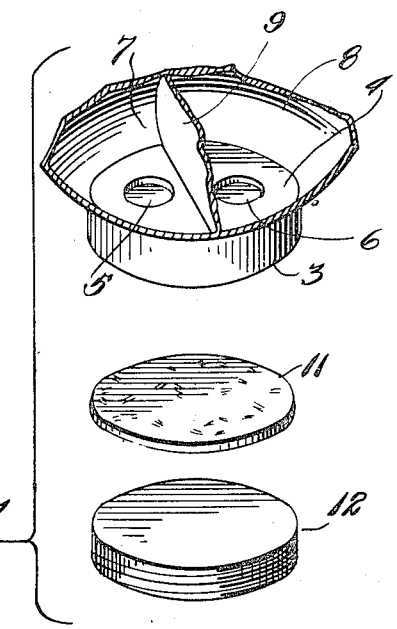
Witnesses
Inventor
U. V. Averitt
By
Attorneys

UNITED STATES PATENT OFFICE.

URI V. AVERITT, OF HANOVER, INDIANA.

COMBINATION SALT AND PEPPER SHAKER.

1,259,469.

Specification of Letters Patent.  Patented Mar. 19, 1918.

Application filed March 1, 1916. Serial No. 81,433.

*To all whom it may concern:*

Be it known that I, URI V. AVERITT, a citizen of the United States, residing at Hanover, in the county of Jefferson, State of Indiana, have invented certain new and useful Improvements in Combination Salt and Pepper Shakers; and I do hereby declare the following to be a full, clear, and exact description of the invention, such as will enable others skilled in the art to which it appertains to make and use the same.

This invention relates to a combination salt and pepper shaker.

An object of the invention resides in the provision of a shaker in which both salt and pepper may be stored and which is of such construction that the salt and pepper may be selectively shaken therefrom.

A further object of the invention resides in so constructing the device that both the salt and pepper may be shaken therefrom simultaneously.

A still further object of the invention resides in so constructing the device that the flow of the salt or pepper therefrom will be controlled entirely by the position of the shaker.

A still further object of the invention resides in the provision of a shaker which may be filled from the base and which includes means for closing the base and also means for maintaining the closing means in position and protecting the contents of the shaker.

With these and other objects in view, such as will appear as my description progresses, my invention comprises the combination and arrangement of parts as set forth in and falling within the scope of the appended claim.

In the drawing:—

Figure 1 is a perspective view of a shaker constructed in accordance with my invention;

Fig. 2 is a vertical sectional view of the same;

Fig. 3 is a fragmental section, and

Fig. 4 is an exploded view showing the means for closing the apertures in the base of the shaker and the means for maintaining the closing means in position.

In the embodiment of the invention shown in the drawing there is provided a receptacle the top of which is provided with downwardly diverging faces 1 which intersect at 2. The receptacle is provided at its lower end with a base 3 which is internally threaded and located immediately above the base is a bottom 4 which is provided with apertures 5 and 6. The receptacle is divided into two compartments 7 and 8 by a partition 9 which extends vertically and is located in a plane which includes a line of intersection 2 of the faces 1. The aperture 5 communicates with the compartment 7 while the aperture 6 communicates with the compartment 8. The faces 1 are provided with a plurality of holes 10 which extend through the faces. The axes of the holes 10 in the face which forms the top of the compartment 7 extend at right angles to the axes of the holes which extend through the face forming the top of the compartment 8 and these axes diverge upwardly away from the partition 9. This particular arrangement of the holes 10 is advantageous for when the shaker is tilted to permit the salt to flow from the compartment in which it is contained, the holes in the opposite face, that is to say the ones that communicate with the pepper compartment, will be so disposed that the pepper will be retained in the compartment as will be readily appreciated from an inspection of Fig. 2 of the drawing. In order that the user may readily determine in which compartments the salt and pepper are contained, I have arranged the holes 10 which communicate with the salt compartment in the shape of the letter S and the holes 10 which communicate with the pepper compartment in the shape of a P.

In order that the apertures 5 and 6 may be closed, I have provided a disk 11 which is made preferably of cork, which disk is located within the base 3 and engages the under face of the bottom 4. This disk is held in place by means of a plug 12 which is in threaded engagement with the threads on the base 3 and which is relatively heavy so that it will form a counterweight and maintain the shaker in a vertical position, normally. The resiliency of the disk 11 will cause the disk to bear against the plug 12 and will consequently lock the threads of the plug and the threads of the base 3 together so that the accidental displacement of the plug will be prevented.

From the foregoing description it will be seen that I have provided a shaker in which the holes for the exit of the salt and pepper are so arranged that when the shaker is tilted in one position the salt will be permitted to flow therefrom and the pepper will be retained while, when the shaker is tilted to another position, the pepper will be permitted to flow from the shaker and the salt retained. Further when the shaker is inverted both the salt and pepper may be shaken therefrom. Furthermore I have provided means for closing the filling apertures so that the salt and pepper within the container will be kept clean and I have further provided means for retaining the aforementioned means in position, which aforementioned means acts to lock the last mentioned means in place.

While I have thus illustrated and described a particular embodiment of my invention it has merely been for the sake of convenience and I do not wish to be limited to that particular embodiment as it is obvious that numerous changes may be made within the scope of the appended claim.

What I claim, is:—

A combination salt and pepper shaker including a receptacle having a single neck portion provided with a pair of intersecting and downwardly diverging and relatively flat faces at its upper end, said faces having holes extending therethrough the axes of the holes in one face extending at right angles to the axes of the holes in the other face, and a partition dividing said receptacle into compartments and having its upper end extending from the line of intersection of said faces.

In testimony whereof, I affix my signature, in the presence of two witnesses.

URI V. AVERITT.

Witnesses:
CLYDE E. BRODHECKER,
HENRY M. LEE.